United States Patent [19]

Mosier

[11] 4,414,602

[45] Nov. 8, 1983

[54] CURRENT DIRECTOR AND INTERFACE CIRCUIT FOR A TRANSFORMER RELAY

[75] Inventor: Douglas R. Mosier, White Bear Lake, Minn.

[73] Assignee: Minnesota Mining and Manufacturing Co., Saint Paul, Minn.

[21] Appl. No.: 332,145

[22] Filed: Dec. 18, 1981

[51] Int. Cl.³ .............................................. H01H 47/32
[52] U.S. Cl. .................................... 361/190; 361/189; 361/160
[58] Field of Search ............... 361/160, 139, 189, 190, 361/205

[56] References Cited

U.S. PATENT DOCUMENTS

| | | |
|---|---|---|
| 1,971,679 | 8/1934 | Dudley . |
| 2,519,247 | 8/1950 | Holden . |
| 2,806,153 | 9/1957 | Walker . |
| 2,859,402 | 11/1958 | Schaeve . |
| 3,010,053 | 11/1961 | Schubert . |
| 3,461,354 | 8/1969 | Bollmeier . |
| 3,486,036 | 12/1969 | Pressman . |
| 3,487,231 | 12/1969 | Dixon, Jr. . |
| 3,656,005 | 4/1972 | Lee . |
| 3,671,816 | 6/1972 | Ritzow . |
| 3,765,015 | 10/1973 | Gruner . |
| 3,790,821 | 2/1974 | Adamson . |
| 3,999,085 | 12/1976 | Kelly et al. . |
| 4,015,142 | 3/1977 | Nagaoka et al. . |
| 4,057,738 | 11/1977 | Nishimura . |
| 4,125,885 | 11/1978 | Lowther et al. . |
| 4,164,666 | 8/1979 | Hirasawa . |
| 4,211,940 | 7/1980 | Minami . |
| 4,213,059 | 7/1980 | Deacey . |
| 4,224,654 | 9/1980 | Goldthorp et al. . |
| 4,227,231 | 10/1980 | Hansen et al. . |
| 4,246,621 | 1/1981 | Tsukioka . |
| 4,251,740 | 2/1981 | Willserding . |
| 4,321,652 | 3/1982 | Baker et al. ........................ 361/209 |
| 4,338,649 | 7/1982 | Mosier ................................ 361/139 |

FOREIGN PATENT DOCUMENTS

2080064 1/1982 United Kingdom .

Primary Examiner—Reinhard J. Eisenzopf
Attorney, Agent, or Firm—Donald M. Sell; James A. Smith; William D. Bauer

[57] ABSTRACT

A current director and interface circuit to prevent damage to a transformer relay by the simultaneous activation of a plurality of bidirectional switches. A current director prevents current flow in the secondary winding of the transformer relay in a second direction above a predetermined switching threshold for a predetermined succeeding time period after current has flowed in the secondary winding of the transformer relay in a first direction above a predetermined inhibit threshold during a predetermined preceding time period.

29 Claims, 7 Drawing Figures

CURRENT DIRECTOR AND INTERFACE CIRCUIT FOR A TRANSFORMER RELAY

BACKGROUND OF THE INVENTION

The present invention relates generally to electronic circuits adapted to cooperate with transformer relays.

Electro-magnetic devices have been used to control high-voltage, high current electrical loads with remotely located low voltage switches. Generically these devices are called transformer relays. For purposes of this application, a transformer relay includes unitary electro-magnetic devices and a combination of a transformer and a relay coupled to perform a similar function.

One transformer relay is disclosed in U.S. Pat. No. 3,461,354, Bollmeier, MAGNETIC REMOTE CONTROL SWITCH, assigned to the assignee of the present application. Another transformer relay is disclosed in U.S. Pat. No. 4,321,652, Baker, et al, LOW VOLTAGE TRANSFORMER RELAY, issued Mar. 23, 1982 and assigned to the assignee of the present application, which provides an improved version over the Bollmeier transformer relay. Both the Bollmeier patent and the Baker application are incorporated herein by reference.

The transformer relays as described in Bollmeier and Baker are controlled by a directional flow of current in a secondary winding of the transformer relay above a predetermined switching threshold. A typical use of these transformer relays would be to connect them to one or more bidirectional switches. For purposes of this application, a bidirectional switch is a switch which is controlled by an operator to selectively allow only unidirectional flow of current between its terminals.

One principal advantage of a transformer relay is the ability to control one transformer relay from a plurality of locations and also to control a plurality of transformer relays from one switch location. An example would be to control a light, or a group of lights, in an office building from several different locations as well as from a single, central location.

U.S. Pat. No. 4,338,649, Mosier, SYSTEM FOR REMOTELY CONTROLLING A LOAD, issued July 6, 1982 and assigned to the assignee of the present application, discloses a system utilizing electronics to couple a plurality of bidirectional switches with a transformer relay. U.S. Pat. No. 4,384,314, Doty, et al, CONTROL SYSTEM FOR A PLURAL TRANSFORMER RELAY, issued May 17, 1983 and assigned to the assignee of the present application, discloses a control system for allowing a bidirectional switch to control a plurality of transformer relays. Both of these applications disclose interface circuits or control systems for utilizing a plurality of transformer relays and/or a plurality of bidirectional switches.

A problem, however, exists in the use of transformer relays with multiple bidirectional switches. In the case where a plurality of bidirectional switches are coupled directly to the secondary winding of a transformer relay, simultaneous activation, in opposite directions, of at least two bidirectional switches results in an effective short across the secondary winding of the transformer relay. This may cause the transformer relay to switch following the waveform of the excitation power. For a 60 Hertz power system, this may cause the transformer relay to switch 120 times per second, once for each half cycle of the power waveform. This relatively rapid switching may produce a great deal of heat within the load switching contacts and, if continued, could result in permanent damage to the transformer relay. The interface circuits and control systems disclosed in the Mosier and Doty applications, do not alleviate this problem, the interface circuits and control systems being designed for different purposes.

SUMMARY OF THE INVENTION

A current director is adapted to cooperate with a transformer relay and a bidirectional switch. The transformer relay has a primary winding adapted to be coupled to an alternating current energy source, has a load switch adapted to control the application of the energy source to a load, and has a secondary winding which controls the load switch to a first position and a second position depending upon the current flow in the secondary winding above a predetermined switching threshold in a first direction and a second direction, respectively. The current director is operatively coupled to the secondary winding of the transformer relay and to the bidirectional switch. The current director prevents current flow in the secondary winding in the second direction above the predetermined switching threshold for a predetermined succeeding time period after current flow in the secondary winding in the first direction above a predetermined inhibit threshold during a predetermined preceding time period.

In a preferred embodiment, the magnitude of the predetermined inhibit threshold is not larger than the magnitude of the predetermined switching threshold. Also, in preferred embodiments, the immediately preceding predetermined time period is not more than one-half of one cycle of the alternating current energy source and the predetermined succeeding time period is not less than one-half of one cycle of the alternating current energy source.

In an alternative embodiment, an interface circuit is adapted to be coupled between a transformer relay and a bidirectional switch. Again, a transformer relay has a primary winding adapted to be coupled to an alternating current energy source, has a load switch adapted to control the application of the energy source to a load, and has a secondary winding which controls said load switch depending upon the directional current flow above a predetermined switching threshold in the secondary winding. A current directing means is coupled to the secondary winding and to the bidirectional switch. The current directing means allows directional current flow above the predetermined switching threshold in the secondary winding in a first direction, and selectively allows current flow above the predetermined switching threshold in the secondary winding in a second direction in response to a control signal. A control means is coupled to the current directing means and to the secondary winding. The control means selectively supplies the control signal. The supplying of the control signal is inhibited for an immediately succeeding time period after current has flowed above a predetermined inhibit threshold in the first direction through the secondary winding during an immediately preceding predetermined time period. In this way, directional current flow in the secondary winding of the transformer relay above the predetermined inhibit threshold in the first direction prevents directional current flow in the secondary winding of the transformer relay above the predetermined switching threshold in the second direction for the immediately succeeding predetermined time period.

In preferred embodiments, the magnitude of the predetermined inhibit threshold is not larger than the magnitude of the predetermined switching threshold. Also, in a preferred embodiment, the operating current in the secondary winding of the transformer relay when the bidirectional switch is activated is not less than the magnitude of the predetermined switching threshold. It is also a preferred embodiment where the current flow above the predetermined switching threshold in the first direction in the secondary winding controls the load switch to an open position and where a current flow above the predetermined switching threshold in the second direction in the secondary winding controls the load switch to a closed position.

The circuits and systems described prevent abuse of the transformer relay by the simultaneous activation of a plurality of bidirectional switches. Such activation of a plurality of bidirectional switches in opposite directions will disable the switching of the transformer relay in one direction, thus preventing the rapid switching and resultant heat generation which could result in permanent damage to the transformer relay. The period of disablement could be tied to the need for preventing harm to the transformer relay and to providing reasonable response to the operator of the bidirectional switch.

BRIEF DESCRIPTION OF THE DRAWINGS

The foregoing advantages, construction and operation of the present invention will become more readily apparent from the following description and accompanying drawings in which.

DESCRIPTION OF THE PREFERRED EMBODIMENTS

Figure 1:
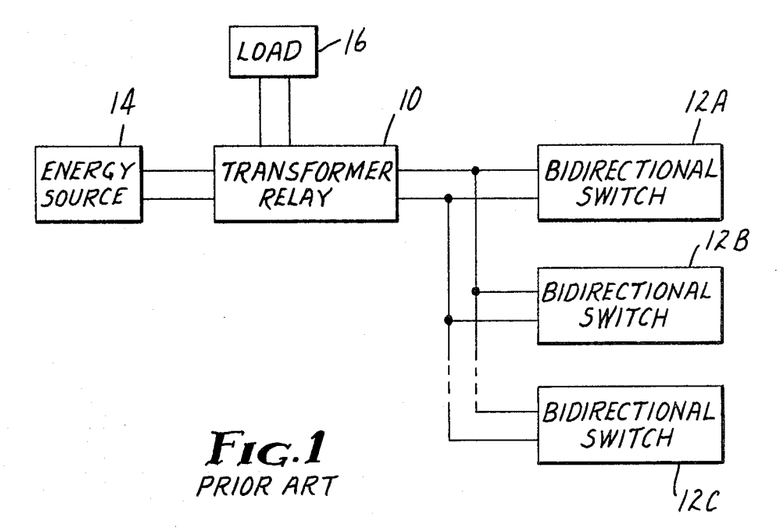
FIG. 1 is a block diagram of a prior art control system utilizing a transformer relay and a plurality of bidirectional switches.

FIG. 1 illustrates a block diagram of a prior art control system utilizing transformer relay 10 and a plurality of bidirectional switches 12A, 12B, 12C. An alternating current energy source 14 is shown coupled to the primary winding of the transformer relay 10. A load 16 is shown coupled to the load switch of the transformer relay 10. The bidirectional switches 12A, 12B, 12C are shown connected in parallel to the secondary winding of the transformer relay 10. This control system is essentially the same as that control system depicted in the Bollmeier patent and the Baker application. The application of the alternating current energy source 14 to the primary winding of the transformer relay 10 would induce an alternating voltage waveform on the secondary winding of the transformer relay 10. An alternating current flow would then occur in the secondary winding of the transformer relay 10 if a suitably low resistance current path were provided. Activation of any one of the bidirectional switches 12A, 12B, or 12C will allow current to flow in the secondary winding of the transformer relay 10 in one direction only. This unidirectional current flow in the secondary winding of the transformer relay 10 will cause the load switch of the transformer relay 10 to apply or remove power from the alternating current energy source 14 to the load 16.

Figure 2:
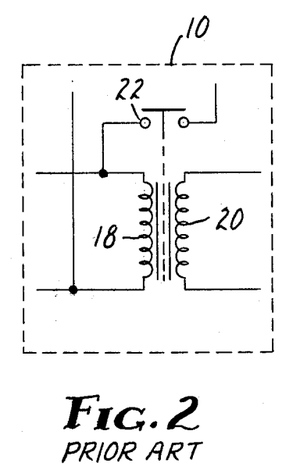
FIG. 2 is a schematic representation of a transformer relay.

FIG. 2 is a schematic representation of a transformer relay 10. The transformer relay 10 has a primary winding 18, a secondary winding 20 and a load switch 22. While the preferred structure for the transformer relay 10 is as illustrated in FIG. 2, it is to be understood that other forms and representations of a transformer relay including the use of a separate transformer and a separate relay coupled in a manner to provide the function of a transformer relay, is suitable for use with the present invention and its scope is specifically included herein.

Figure 3:
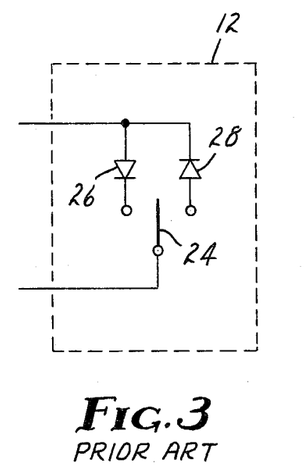
FIG. 3 is a prior art schematic representation of a bidirectional switch.

FIG. 3 is a schematic representation of a bidirectional switch 12. The bidirectional switch 12 in FIG. 3 could be used for any one or all of the bidirectional switches 12A, 12B, 12C in FIG. 1. The bidirectional switch 12 in FIG. 3 is a single pole, double throw switch 24, whose common side is coupled to one terminal of the bidirectional switch. A diode 26 and oppositely oriented diode 28 are respectively coupled to the switched contacts of the single pole, double throw switch 24. Diodes 26 and 28 are oriented in opposite directions, and are, in turn, coupled to the other terminal of the bidirectional switch 12. While the bidirectional switch 12 of FIG. 3 is preferred for some applications in the use of the present invention, it is to be understood that other forms, embodiments, and circuits could be used in place of the bidirectional switch 12 as long as the function of providing a unidirectional current flow between its terminals is provided. Examples of other circuits which could be utilized for this function are described in the Mosier application.

Figure 4:
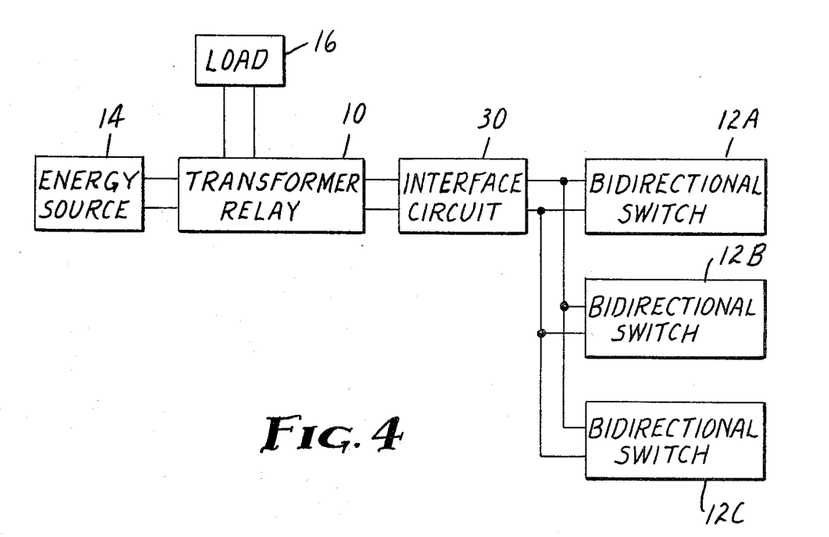
FIG. 4 is a block diagram of a control system utilizing the interface circuit of the present invention with prior art transformer relay and a plurality of bidirectional switches.

FIG. 4 is a block diagram showing the insertion of the present invention into the block diagram of FIG. 1. Again, the transformer relay 10 is shown connected to an alternating current energy source 14 and to a load 16 in the same manner as FIG. 1. Again, three bidirectional switches are shown, 12A, 12B, and 12C. An interface circuit 30 is shown coupled between the secondary winding of the transformer relay 10 and the bidirectional switches 12A, 12B, 12C. The purpose of the interface circuit 30 is to disallow a unidirectional flow of current in a certain direction after a unidirectional flow of current has occurred in the opposite direction above a predetermined threshold. In general, not every flow of current in the secondary winding of the transformer relay 10 will cause a switching action of that transformer relay 10. Such a flow of current in the secondary winding of the transformer relay 10 must be above a predetermined threshold. Further, that predetermined threshold may be of one magnitude for a unidirectional flow of current in one direction and of a second magnitude for a unidirectional flow of current in a second direction. For purposes described herein, a predetermined switching threshold means that current in the secondary winding of the transformer relay 10 at or above which will cause the transformer relay 10 to switch for current flow in that direction. The interface circuit 30 in FIG. 4 will unconditionally allow a flow of current in a first direction depending, of course, on the activation of one of the bidirectional switches 12A, 12B, and 12C in that direction. The interface circuit 30, however, will not allow a unidirectional flow of current in the second direction, above the switching threshold in that direction, for a predetermined succeeding period of time after current flow has occurred above a predetermined inhibit threshold in the first direction for a predetermined preceding time period. In a preferred embodiment, the predetermined inhibit threshold is not larger than the magnitude of the predetermined switching threshold. In this manner, the interface circuit 30 will effectively prevent the rapid switching of the transformer relay 10 which would otherwise result from the simultaneous activation of a plurality of bidirectional switches, 12A, 12B or 12C in opposite directions. The interface circuit 30 may disable such current flow in the second direction for one-half of one cycle of the waveform of the alternating current energy source 14 or for such other time as may be desired. Similarly interface circuit 30 may require that the current flow in the first direction above the inhibit threshold may be present for a predetermined period of time before disablement of current flow in the second direction.

Figure 5:
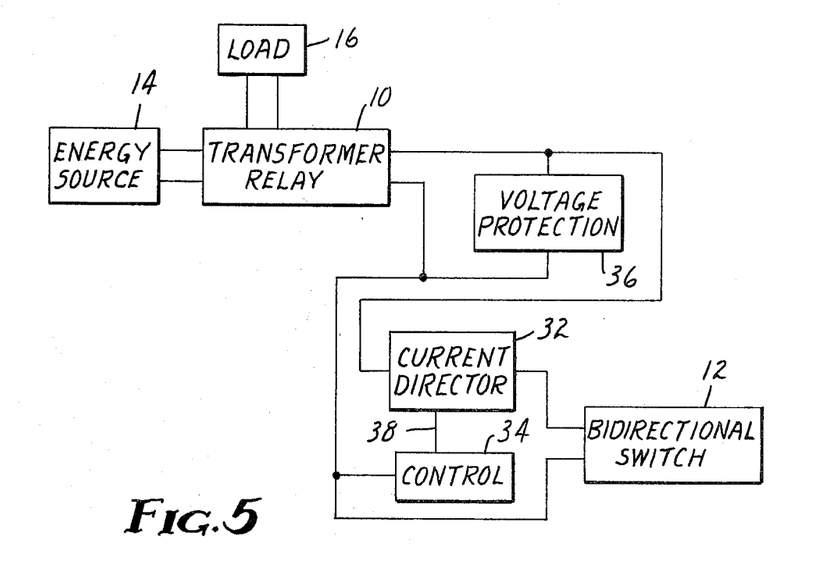
FIG. 5 is a more detailed block diagram of a control system utilizing the present invention.

FIG. 5 presents a more detailed block diagram of the control system utilizing the present invention. Again, transformer relay 10 is shown connected to an energy source 14 and a load 16. For ease of illustration, only one bidirectional switch 12 is illustrated. However, it is to be understood that a plurality of bidirectional switches 12 could be connected in parallel. The interface circuit 30 of FIG. 4 is shown replaced by a current director 32 and a control 34. In a preferred embodiment, the interface circuit 30 also includes a voltage protection circuit 36 although it is not required. In FIG. 5, control 34 monitors the flow of current in the first direction and removes a control signal previously present along line 38 to the current director 32 whenever the inhibit threshold has been exceeded in the first direction. The current director 32 will then prevent current flow in the second direction above the predetermined switching threshold of the transformer relay 10. Voltage protection circuit 36 may be utilized to prevent voltage spikes from damaging the circuitry contained in the current director 32 and the control 34.

Figure 6:
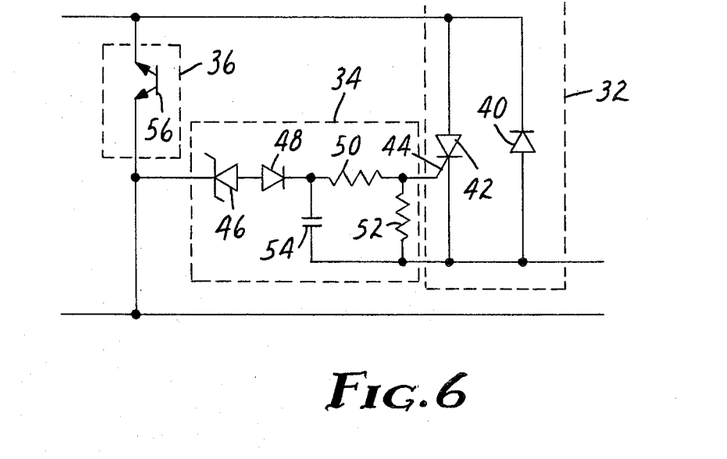
FIG. 6 is a schematic representation of the interface circuit of the present invention.

FIG. 6 is a schematic representation of the current director 32, the control 34 and the voltage protection circuit 36.

Current director 32 consists of oppositely parallel connected semiconducting devices. Diode 40 is oriented to unconditionally allow current flow in the secondary winding of the transformer relay 10 in the first direction. Silicon controlled rectifier (SCR) 42 is oriented to allow current flow in the second direction in the secondary winding of the transformer relay 10 only when the proper voltage, or signal, is present at its gate terminal 44. In FIG. 6, the control signal is illustrated as comprising two separate lines, the gate terminal 44 to the silicon controlled rectifier 42 and its cathode reference. Of course, it is to be understood that with other current directing circuits a different number of control signal lines other than two may be required.

Control 34 is schematically illustrated in FIG. 6 consisting of zener diode 46, a diode 48, resistors 50 and 52, and a capacitor 54. If none of the bidirectional switches 12 are activated, a positive voltage across the control 34 will cause a small amount of current to flow through diode 48 in the first direction and to charge capacitor 54. The charging current is kept small, below the switching threshold of the transformer relay 10 in the first direction, due to the internal impedance of the secondary winding of the transformer relay 10, the values of capacitor 54 and resistors 50 and 52, the voltage drop of zener diode 46 and the gate to cathode junction resistance of the silicon controlled rectifier 42 in the current director 32. When capacitor 54 is allowed to be charged, a sufficient voltage is present at gate terminal 44 of the silicon controlled rectifier 42 to allow the silicon controlled rectifier to fire and allow the current director 32 to allow current flow in the second direction if it were called for by one or more of the bidirectional switches 12. If, however, one or more of the bidirectional switches 12 allow current flow in the first direction, capacitor 54 would discharge through resistors 50 and 52 causing the voltage at gate terminal 44 to drop and result in the absence of the control signal otherwise present at that point. Capacitor 54 and resistors 50 and 52 have an RC time constant which determines the preceding time period during which current flow in the first direction in the secondary winding above the predetermined inhibit amount occurs before current flow in the second direction in said secondary winding is prevented. It is preferred that the preceding time period be not more than one-half cycle of the alternating current energy source 14. The absence of a sufficient voltage at gate terminal 44 of the silicon controlled rectifier 42 would thereafter prevent the firing of the silicon controlled rectifier 42 and would prevent current flow in the second direction until capacitor 54 was recharged. Capacitor 54 would not recharge, of course, until current flow in the first direction ceased or dropped below the predetermined inhibit amount. The time period after current flow in the first direction in the secondary winding has fallen below the inhibit threshold until capacitor 54 has been recharged to the level at which the control signal is supplied to the current director 32 is the predetermined succeeding time period. It is preferred that the succeeding time period be long enough to prevent current flow in the second direction above the switching threshold for the next half cycle of the alternating current energy source 14. For this reason, it is preferred that the succeeding time period be not less than one-half cycle of the alternating current energy source.

The presence of the control signal in the schematic diagram of FIG. 6 is defined as the presence of a voltage, and vice versa. It is to be understood, however, that other means could be provided and still be within the scope of the present invention. In an alternative embodiment, the absence of a voltage could indicate the presence of the control signal and vice versa. Similarly, other schemes could also be utilized.

The voltage protection circuit 36 is also illustrated in FIG. 6. The voltage protection circuit in a preferred embodiment consists solely of a diac 56 coupled across the secondary winding of the transformer relay 10 to prevent voltage spikes from harming both the current director 32 and the control 34.

Other forms of voltage protection such as one or more zener diodes, metal oxide varistors and other protection circuitry are also acceptable.

Figure 7:
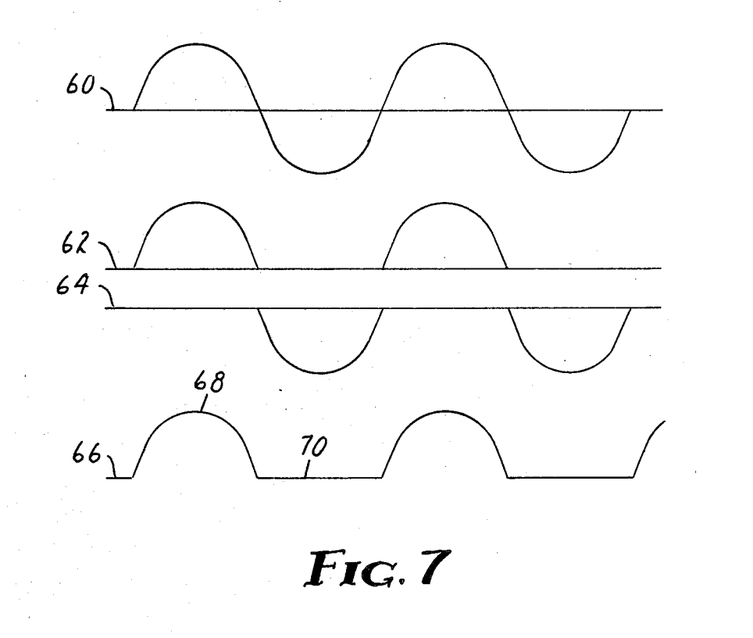
FIG. 7 is a representation of exemplary waveforms utilizing the system of the present invention.

The effect of the implementation of the circuit in FIG. 6 can be illustrated by reference to the waveforms in FIG. 7. Waveform 60 represents the full sinusoidal waveform present from the alternating current energy source 14 which is induced into the secondary winding of the transformer relay 10. For illustrative purposes, excursions above the center of the waveform are considered to be in a first direction and excursions below the center of the waveform are considered to be in the second direction. Waveform 62 therefore represents the waveform of the current present in the secondary winding of the transformer relay 10 when one or more of the bidirectional switches 12 are activated in a first direction. Current is allowed to flow in the first direction but is disallowed in the second direction due to the bidirectional switch 12. Similarly, waveform 64 represents the opposite condition. Here, one or more of the bidirectional switches 12 is allowing current flow in a second direction but is preventing the flow of current in the first direction. In a preferred embodiment, waveform 62 would be switching the transformer relay to an "OFF" condition and waveform 64 would be switching the transformer relay to an "ON" condition. Without the implementation of the present invention, simultaneous activation of the bidirectional switches 12 in opposite directions presents an effective short across the secondary winding of the transformer relay, and current flow in the secondary winding would be allowed in both directions as represented by waveform 60. In this condition, the transformer relay 10 would switch "OFF" on each positive excursion, and would switch "ON" on each negative excursion of the waveform. This would result in the transformer relay 10 switching "OFF" each half cycle and "ON" each alternate half cycle of the alternating current energy source 14 waveform. In a 60 Hertz system this would result in 120 switches of the transformer relay within a one second period of time. The inclusion of the circuitry in FIG. 6, however, will prevent this problem. For example, waveform 66 shows the resultant waveform. Assume that simultaneous activation of two or more of the bidirectional switches 12 in opposite directions has resulted in an effective short. The current director 32 would allow the first half cycle 68 in the first direction to occur unconditionally. Then, however, the control 34 would sense the current flow in the first direction and would not send the control signal to the current director, due to the discharge of capacitor 54 and thus the current director 32 would not allow current flow during the subsequent half cycle 70. Since only positive excursions of the current waveform in the secondary winding are allowed, the transformer relay would be switched only in the "OFF" condition, and thus, would not be subjected to the very rapid switching which would result from the waveform 60.

For purposes described herein, the time periods defined as preceding and succeeding shall be measured from the point in time at which the control 34 determines that current flow in the secondary winding should be prevented and acts to prevent it by causing the absence of the control signal. This may occur repeatedly, of course, without the re-establishment of the control signal if bidirectional switches are still simultaneously activated after the expiration of the predetermined succeeding time period and nevertheless, a new succeeding time period will again run.

Also, for purposes described herein, the use of the term predetermined to establish time periods and value levels does not necessarily mean that the same time period or value must exactly reoccur at exactly the same time period or value in each instance. Rather, predetermined means that the reoccurrence is not random and reoccurs with some predictability in time period or value.

An exemplary list of component values and part numbers for the schematics shown in FIG. 6 is contained in Table I:

TABLE I

| Reference Number | Type | Value or Part No. | Manufacturer |
| --- | --- | --- | --- |
| 40 | Diode | 1N4004 | |
| 42 | Silicon Controlled Rectifier | EC 103B or 2N5061 | Teccor |
| 46 | Zener Diode | 1N4724A | |
| 48 | Diode | 1N4004 | |
| 50 | Resistor | 510 ohms | |
| 54 | Capacitor | 1 microfarad | |
| 56 | Diac | HT 32 or ST2 | Teccor General Electric |

Thus, it can be seen that there has been shown and described a novel current director and interface circuit adapted to be coupled to a transformer relay and a plurality of bidirectional switches. It is to be understood, however, that various changes, modifications and substitutions in the form of the details of the described apparatus can be made by those skilled in the art without departing from the scope of the invention as defined by the following claims.

What is claimed is:

1. A current director in combination with a transformer relay and a bidirectional switch, said transformer relay having a primary winding adapted to be coupled to an alternating current energy source, having a load switch adapted to control the application of said energy source to a load, and having a secondary winding which controls said load switch to a first position and a second position depending upon current flow in said secondary winding above a predetermined switching threshold in a first direction and a second direction, respectively, said current director operatively coupled to said secondary winding of said transformer relay and to said bidirectional switch, said current director preventing current flow in said secondary winding in said second direction above said predetermined switching threshold for a predetermined succeeding time period after current has flowed in said secondary winding in said first direction above a predetermined inhibit threshold during a predetermined preceding time period.

2. A current director as in claim 1 wherein the magnitude of said predetermined inhibit threshold is not larger than the magnitude of said predetermined switching threshold.

3. A current director as in claim 1 wherein said preceding predetermined time period is not more than one-half of one cycle of said alternating current energy source.

4. A current director as in claim 1 wherein said predetermined succeeding time period is not less than one-half of one cycle of said alternating current energy source.

5. An interface circuit coupled between a transformer relay and a bidirectional switch, said transformer relay having a primary winding adapted to be coupled to an alternating current energy source, having a load switch adapted to control the application of said energy source to a load, and having a secondary winding which controls said load switch depending upon the directional current flow above a predetermined switching threshold in said secondary winding, comprising:

current directing means coupled to said secondary winding and to said bidirectional switch, said current directing means for allowing directional current flow above said predetermined switching threshold in said secondary winding in a first direction and for selectively allowing current flow above said predetermined switching threshold in said secondary winding in a second direction in response to a control signal; and control means coupled to said current directing means and to said secondary winding, said control means for selectively supplying said control signal, said supplying of said control signal being inhibited for an immediately succeeding time period after current has flowed above a predetermined inhibit threshold in said first direction through said secondary winding during an immediately preceding predetermined time period;

whereby directional current flow in said secondary winding of said transformer relay above said predetermined inhibit threshold in said first direction prevents the directional current flow in said secondary winding of said transformer relay above said predetermined switching threshold in said second direction for said immediately succeeding predetermined time period.

6. An interface circuit as in claim 5 wherein the magnitude of said predetermined inhibit threshold is not larger than the magnitude of said predetermined switching threshold.

7. An interface circuit as in claim 5 wherein said transformer relay has an operating current in said secondary winding when said bidirectional switch is activated, wherein said operating current is not less than the magnitude of said predetermined switching threshold, and wherein the magnitude of said inhibit threshold is not larger than the magnitude of said operating current.

8. An interface circuit as in claim 5 wherein said immediately preceding predetermined time period is not more than one-half of one cycle of said alternating current energy source.

9. An interface circuit as in claim 8 wherein said immediately succeeding predetermined time period is not less than one-half of one cycle of said alternating current energy source.

10. An interface circuit as in claim 5 wherein a current flow above said predetermined switching threshold in said first direction in said secondary winding controls said load switch to an open position and wherein a current flow above said predetermined switching threshold in said second direction in said secondary winding controls said load switch to a closed position.

11. An interface circuit as in claim 5 wherein said current directing means comprises:
a first diode; and
a silicon controlled rectifier;
said first diode and said silicon controlled rectifier being parallel coupled in opposite directions to form a parallel combination, said parallel combination being coupled in series with said bidirectional switch; said silicon controlled rectifier having a gate terminal responsive to said control signal.

12. An interface circuit as in claim 11 wherein said control means comprises:

a storage circuit coupled between said secondary winding and said current directing means for providing said control signal when charged; and a second diode coupled in series with said storage circuit oriented to allow said storage circuit to accumulate charge when current flow in said secondary winding is in said first direction and not above said predetermined inhibit threshold;

whereby when said bidirectional switch allows a directional current flow above said predetermined inhibit threshold in said secondary winding in said first direction, said storage circuit will not be charged and will not produce said control signal; and whereby when said bidirectional switch does not allow a directional current flow above said predetermined inhibit threshold in said secondary winding in said first direction, said storage circuit will be charged and will produce said control signal.

13. An interface circuit as in claim 12 which further comprises:
a zener diode coupled in series with said storage circuit and said second diode, said zener diode oriented oppositely to said second diode.

14. An interface circuit as in claim 5 which further comprises voltage protection means coupled across said current directing means.

15. An interface circuit coupled between a transformer relay and a plurality of parallel connected bidirectional switches, said transformer relay having a primary winding adapted to be coupled to an alternating current energy source, having a load switch adapted to control the application of said energy source to a load, and having a secondary winding which controls said load switch depending upon the directional current flow above a predetermined switching threshold in said secondary winding, comprising:

current directing means coupled to said secondary winding and to said plurality of parallel connected bidirectional switches, said current directing means for allowing directional current flow above said predetermined switching threshold in said secondary winding in a first direction and for selectively allowing current flow above said predetermined switching threshold in said secondary winding in a second direction in response to a control signal; and control means coupled to said current directing means and to said secondary winding, said control means for selectively supplying said control signal, said supplying of said control signal being inhibited for an immediately succeeding time period after current has flowed above a predetermined inhibit threshold in said first direction through said secondary winding during an immediately preceding predetermined time period;

whereby directional current flow above said predetermined inhibit threshold in said secondary winding in said first direction will prevent the directional current flow above said predetermined threshold in said secondary winding in said second direction for said immediately succeeding predetermined time period; and whereby a simultaneous activation of said plurality of parallel connected bidirectional switches in opposite directions will allow a directional current flow above said predetermined switching threshold in said secondary winding in said first direction but will prevent a directional current flow above said predetermined switching threshold in said secondary winding in said second direction.

16. An interface circuit as in claim 15 wherein the magnitude of said predetermined inhibit threshold is not larger than the magnitude of said predetermined switching threshold.

17. An interface circuit as in claim 15 wherein said immediately preceding predetermined time period is not more than one-half of one cycle of said alternating current energy source.

18. An interface circuit as in claim 17 wherein said immediately succeeding predetermined time period is not less than one-half of one cycle of said alternating current energy source.

19. An interface circuit as in claim 15 wherein a current flow above said predetermined switching threshold in said first direction in said secondary winding controls said load switch to an open position and wherein a current flow above said predetermined switching threshold in said second direction in said secondary winding controls said load switch to a closed position.

20. An interface circuit as in claim 15 wherein said current directing means comprises:
a first diode; and
a silicon controlled rectifier;
said first diode and said silicon controlled rectifier being parallel coupled in opposite directions to form a parallel combination, said parallel combination being coupled in series with said plurality of parallel connected bidirectional switches; said silicon controlled rectifier having a gate terminal responsive to said control signal.

21. An interface circuit as in claim 20 wherein said control means comprises:
a storage circuit coupled between said secondary winding and said current directing means for providing said control signal when charged; and
a second diode coupled in series with said storage circuit oriented to allow said storage circuit to accumulate charge when current flow in said secondary winding is in said first direction and not above said predetermined inhibit threshold;
whereby when any of said plurality of parallel connected bidirectional switches allows a directional current flow above said predetermined inhibit threshold in said secondary winding in said first direction, said storage circuit will not be charged and will not produce said control signal; and
whereby when said plurality of parallel connected bidirectional switches do not allow a directional current flow above said predetermined inhibit threshold in said secondary winding in said first direction, said storage circuit will be charged and will produce said control signal.

22. An interface circuit as in claim 21 which further comprises
a zener diode coupled in series with said storage circuit and said second diode, said zener diode oriented oppositely to said second diode.

23. An interface circuit connected between a transformer relay and a bidirectional switch, said transformer relay having a primary winding adapted to be coupled to an alternating current energy source, having a load switch adapted to control the application of said energy source to a load, and having a secondary winding which controls said load switch depending upon a current flow in a first direction in said secondary winding above a first predetermined switching threshold and upon a current flow in a second direction in said secondary winding above a second predetermined switching threshold, comprising:
current directing means coupled to said secondary winding and to said bidirectional switch, said current directing means for allowing current flow in said first direction in said secondary winding above said first predetermined switching threshold and for selectively allowing current flow in said second direction in said secondary winding above said second predetermined switching threshold in response to a control signal; and
control means coupled to said current directing means and to said secondary winding, said control means for selectively supplying said control signal, said supplying of said control signal being inhibited for an immediately succeeding time period after current has flowed above a predetermined inhibit threshold in said first direction through said secondary winding during an immediately preceding predetermined time period;
wherein the magnitude of said predetermined inhibit threshold is not larger than the magnitude of said second predetermined switching threshold;
whereby directional current flow in said secondary winding of said transformer relay above said predetermined inhibit threshold in said first direction will prevent the directional current flow in said secondary winding of said transformer relay above said second predetermined switching threshold for an immediately succeeding predetermined time period.

24. An interface circuit as in claim 23 wherein said immediately preceding predetermined time period is not more than one-half of one cycle of said alternating current energy source.

25. An interface circuit as in claim 24 wherein said immediately succeeding predetermined time period is not less than one-half of one cycle of said alternating current energy source.

26. An interface circuit as in claim 23 wherein a current flow above said first predetermined switching threshold in said secondary winding controls said load switch to an open position and wherein a current flow above said second predetermined switching threshold in said secondary winding controls said load switch to a closed position.

27. An interface circuit as in claim 23 wherein said current directing means comprises:
a first diode; and
a silicon controlled rectifier;
said first diode and said silicon controlled rectifier being parallel coupled in opposite directions to form a parallel combination, said parallel combination being coupled in series with said bidirectional switch; said silicon controlled rectifier having a gate terminal responsive to said control signal.

28. An interface circuit as in claim 27 wherein said control means comprises:
a storage circuit coupled between said secondary winding and said current directing means for providing said control signal when charged; and
a second diode coupled in series with said storage circuit oriented to allow said storage circuit to accumulate charge when current flow in said secondary winding is in said first direction and not above said predetermined inhibit threshold;

whereby when said bidirectional switch allows a directional current flow above said predetermined inhibit threshold in said secondary winding in said first direction, said storage circuit will not be charged and will not produce said control signal; and whereby when said bidirectional switch does not allow a directional current flow above said predetermined inhibit threshold in said secondary winding in said first direction, said storage circuit will be charged and will produce said control signal.

29. An interface circuit as in claim 28 which further comprises:

a zener diode coupled in series with said storage circuit and said second diode, said zener diode oriented oppositely to said second diode.

* * * * *